(12) United States Patent
Tsai et al.

(10) Patent No.: US 11,744,226 B2
(45) Date of Patent: Sep. 5, 2023

(54) PET FEEDING APPARATUS

(71) Applicant: Chicony Electronics Co., Ltd., New Taipei (TW)

(72) Inventors: Pei-Sheng Tsai, New Taipei (TW); Wen-Lung Chen, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 109 days.

(21) Appl. No.: 17/352,813

(22) Filed: Jun. 21, 2021

(65) Prior Publication Data

US 2022/0079115 A1 Mar. 17, 2022

Related U.S. Application Data

(60) Provisional application No. 63/076,956, filed on Sep. 11, 2020.

(30) Foreign Application Priority Data

Dec. 15, 2020 (TW) .................................. 109144352

(51) Int. Cl.
*A01K 5/02* (2006.01)
*A01K 5/01* (2006.01)

(52) U.S. Cl.
CPC .......... *A01K 5/0258* (2013.01); *A01K 5/0114* (2013.01); *A01K 5/0291* (2013.01)

(58) Field of Classification Search
CPC ...... A01K 5/02; A01K 5/0258; A01K 5/0291; A01K 5/0114
See application file for complete search history.

(56) References Cited

U.S. PATENT DOCUMENTS 4,890,577 A * 1/1990 Maibach ................... A01K 5/02
119/52.1
6,325,115 B1 * 12/2001 Cowland .................. A01K 5/02
141/346

(Continued)

FOREIGN PATENT DOCUMENTS

CN 204540461 U 8/2015
CN 106135045 A 11/2016
(Continued)

*Primary Examiner* — Ebony E Evans
(74) *Attorney, Agent, or Firm* — Muncy, Geissler, Olds & Lowe, P.C.

(57) ABSTRACT

A pet feeding apparatus includes a feed tank, a discharge tank, and an ejection assembly. The feed tank includes an accommodation chamber and a discharge outlet communicating with the accommodation chamber. The discharge tank includes an ejection outlet, an inlet, and an ejection chamber located between the ejection outlet and the inlet. The inlet communicates with the discharge outlet of the feed tank. The ejection assembly includes a rotation blade and a driving member. The rotation blade is received in the ejection chamber, and the rotation blade includes a rotation shaft and a blade extending from the rotation shaft. The driving member is connected to the rotation shaft and is capable of driving the rotation shaft to rotate with respect to the ejection chamber, so that the driving member drives the blade to swing from the inlet toward the ejection outlet.

13 Claims, 6 Drawing Sheets

(56) References Cited

U.S. PATENT DOCUMENTS

| | | | | |
|---|---|---|---|---|
| 6,789,503 B1* | 9/2004 | Gao | ................ | A01K 5/0291 |
| | | | | 119/51.11 |
| 8,651,408 B1* | 2/2014 | Fox | ................ | B01F 27/172 |
| | | | | 241/261.1 |
| 11,224,202 B2* | 1/2022 | Baxter | ................ | G01F 11/24 |
| 2014/0103148 A1 | 4/2014 | Wisecarver | | |
| 2017/0208781 A1* | 7/2017 | Bogart | ................ | A01K 61/80 |
| 2021/0400909 A1* | 12/2021 | Tsai | ................ | F16H 37/065 |

FOREIGN PATENT DOCUMENTS

| | | | |
|---|---|---|---|
| CN | 205865534 U * | 1/2017 | |
| CN | 108207659 A | 6/2018 | |
| KR | 101370882 B1 * | 8/2012 | |
| TW | M371418 U | 1/2010 | |
| WO | WO-2020185062 A1 * | 9/2020 | |

\* cited by examiner

PET FEEDING APPARATUS

CROSS-REFERENCES TO RELATED APPLICATIONS

This application claims the benefit of U.S. provisional application Ser. No. 63/076,956, filed on Sep. 11, 2020 and claims the priority of Patent Application No. 109144352 filed in Taiwan, R.O.C. on Dec. 15, 2020. The entirety of the above-mentioned patent applications are hereby incorporated by references herein and made a part of the specification.

BACKGROUND

Technical Field

The instant disclosure relates to a feeding apparatus, in particular, to a pet feeding apparatus.

Related Art

Along with changes of life styles, the ratio of people who raise pets (e.g., cats, dogs, rabbits, and so on) increases year by year. In daily lives, the pet owners not only have to take care and accompany with their pets, they but also have to feed the pets at certain times and with certain amounts of feeds so as to keep the pets healthy.

SUMMARY

In general, the pets are fed by providing feeds in a bowl or a plate, putting the bowl or the plate with the feeds, and waiting the pets to eat the feeds themselves. However, such feeding way is neither easy to control the feeding amount, nor to have interactions between the pets and the pet owners.

In view of this, in one embodiment, a pet feeding apparatus is provided. The feeding apparatus comprises a feed tank, a discharge tank, and an ejection assembly. The feed tank comprises an accommodation chamber and a discharge outlet communicating with the accommodation chamber. The discharge tank comprises an ejection outlet, an inlet, and an ejection chamber located between the ejection outlet and the inlet. The inlet communicates with the discharge outlet of the feed tank. The ejection assembly comprises a rotation blade and a driving member. The rotation blade is received in the ejection chamber, and the rotation blade comprises a rotation shaft and a blade extending from the rotation shaft. The driving member is connected to the rotation shaft and is capable of driving the rotation shaft to rotate with respect to the ejection chamber, so that the driving member drives the blade to swing from the inlet toward the ejection outlet.

As above, according to the pet feeding apparatus of one or some embodiments of the instant disclosure, after the pet food enters into the ejection chamber of the discharge tank from the feed tank, the driving member drives the rotation blade to rotate so as to drive the blade to swing from the inlet toward the ejection outlet. Therefore, the pet food can be ejected out from the ejection outlet, thereby achieving the feeding object. Moreover, the pet owners can have interactions with their pets and can control the feeding amounts of the pet food. Moreover, during the operation, the rotation blade does not hit other components, thus reducing the noise during the operation of the apparatus.

BRIEF DESCRIPTION OF THE DRAWINGS

The disclosure will become more fully understood from the detailed description given herein below for illustration only, and thus not limitative of the disclosure, wherein.

DETAILED DESCRIPTION

In the descriptions for the embodiments, the term "connect" are used to indicate that two or more elements are connected to each other physically or electrically in a direct manner, or are used to indicate that two or more elements are connected to each other physically or electrically in an indirect manner. Embodiments are provided for facilitating the descriptions of the instant disclosure. However, the embodiments are provided as examples for illustrative purpose, but not a limitation to the instant disclosure. Moreover, in some figures of the embodiments of the instant disclosure, some components are omitted so as to show the technical features of the instant disclosure in a clear manner. In all the figures, same reference numbers designate identical or similar elements.

Figure 1:
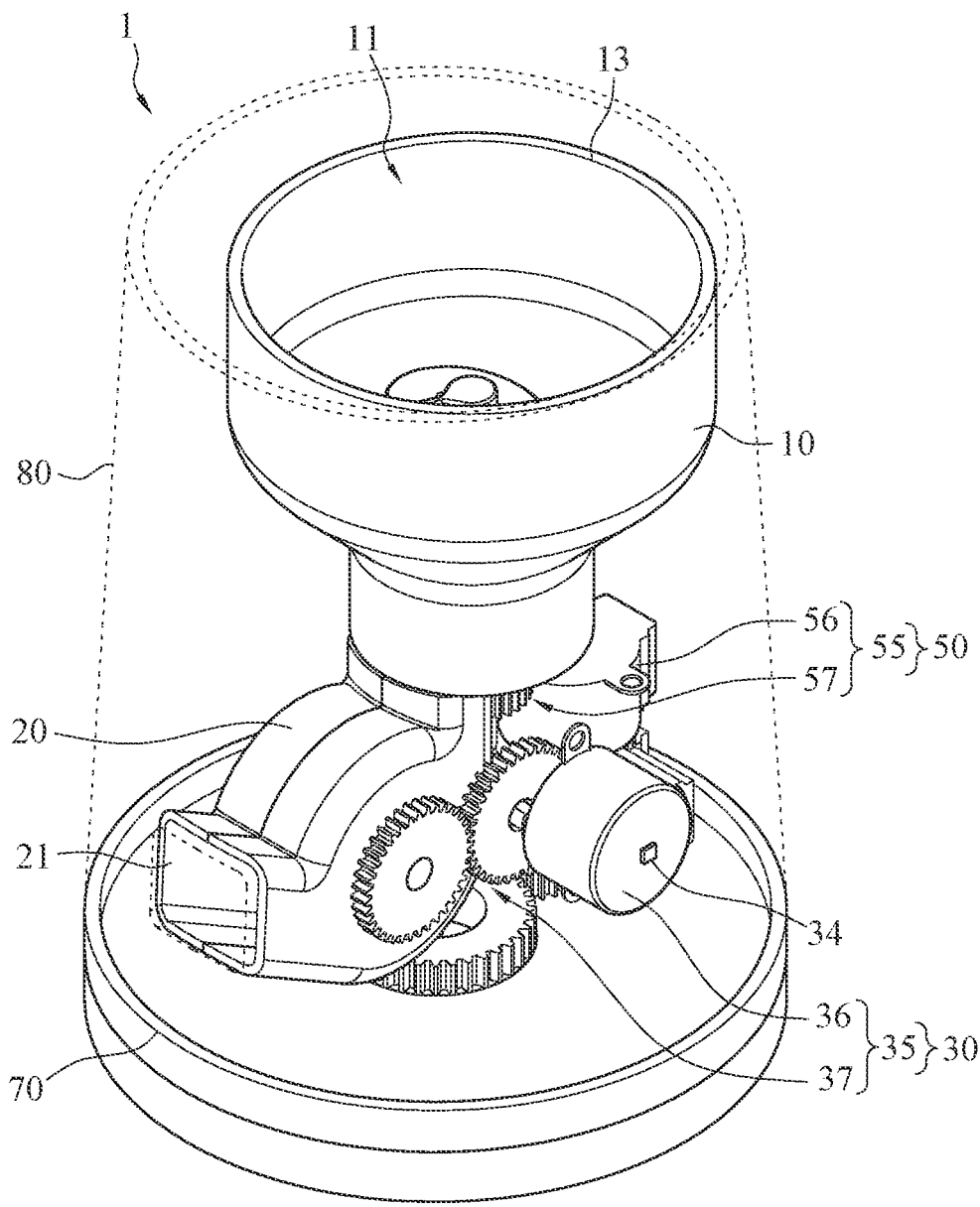
FIG. 1 illustrates a perspective view of a pet feeding apparatus according to a first embodiment of the instant disclosure.
Figure 2:
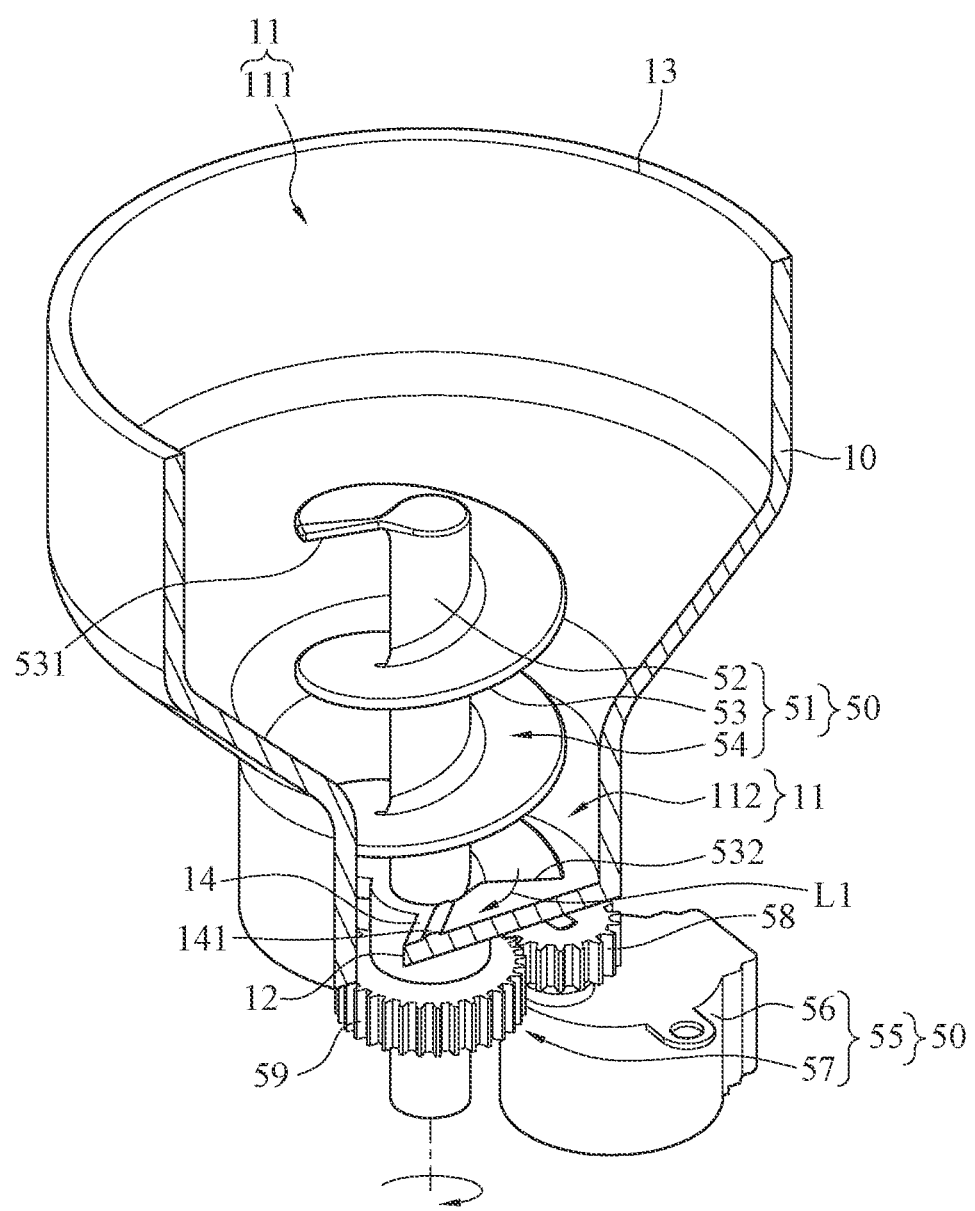
FIG. 2 illustrates a partial perspective view of the pet feeding apparatus of the first embodiment.
Figure 3:
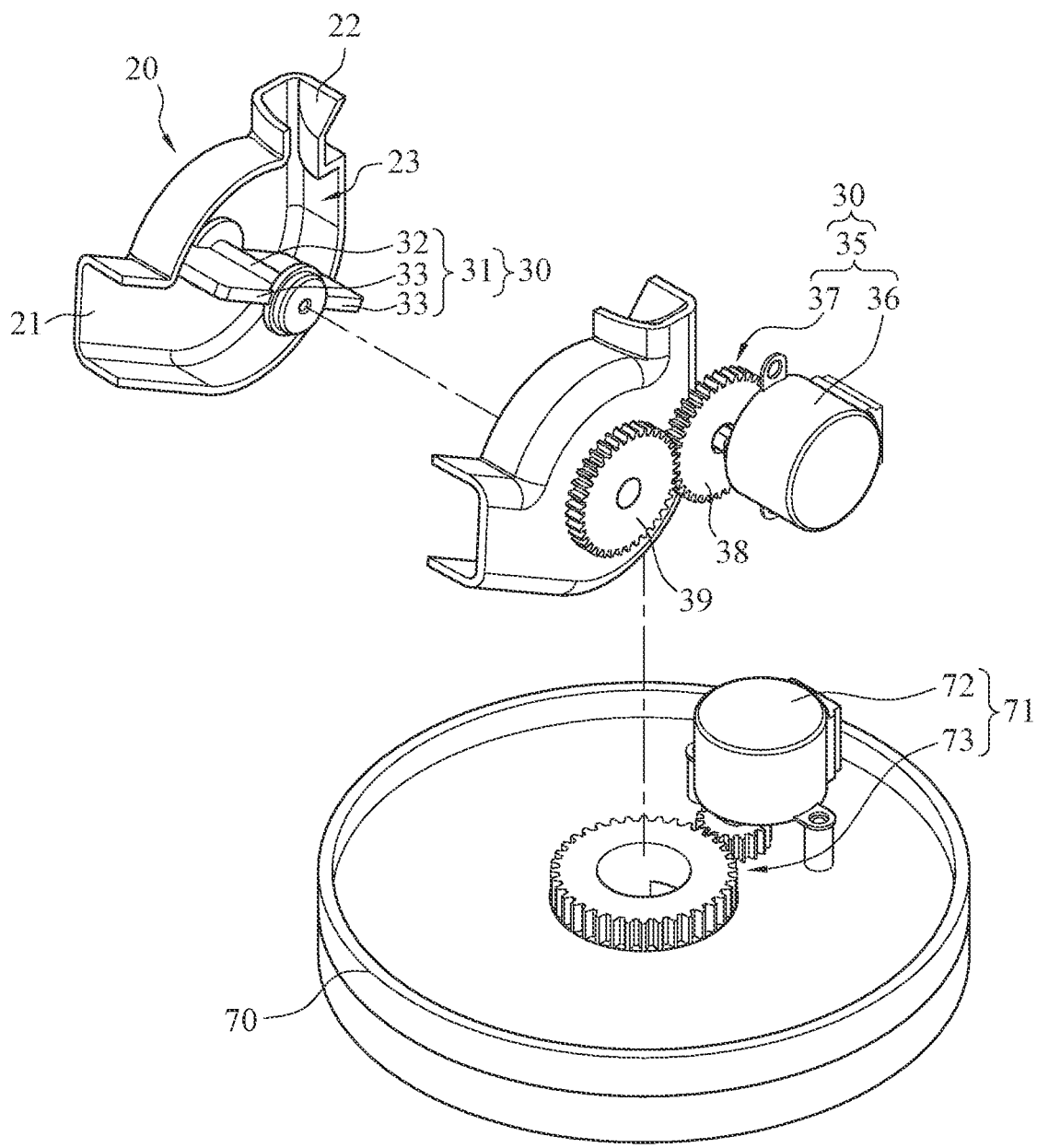
FIG. 3 illustrates a partial exploded view of the pet feeding apparatus of the first embodiment.
Figure 4:
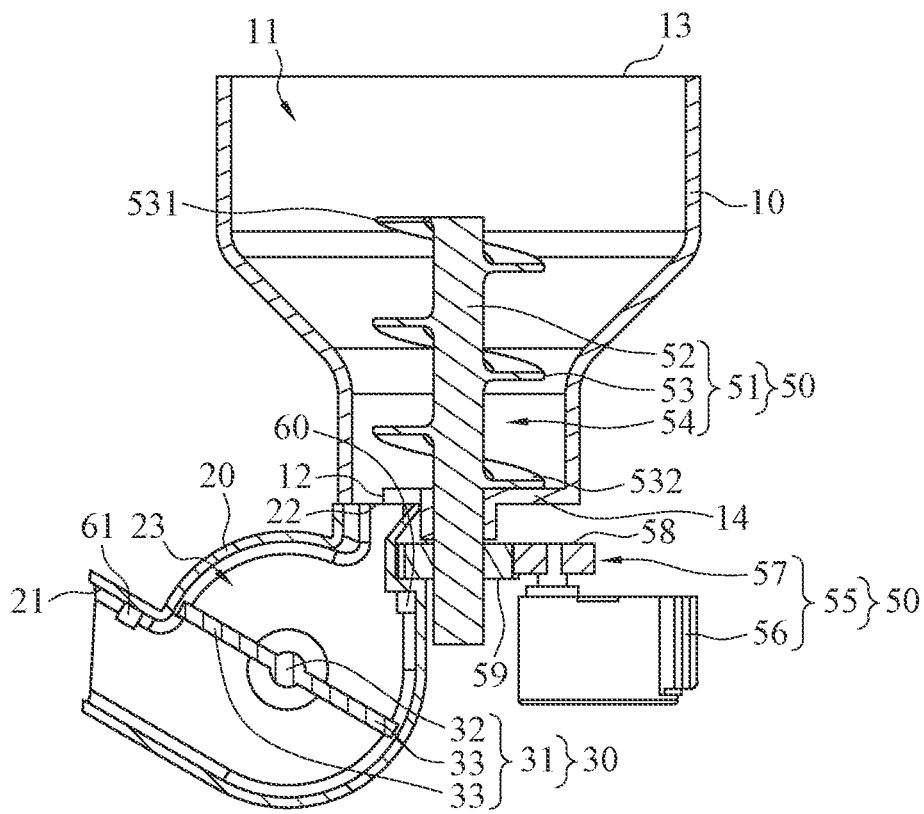
FIG. 4 illustrates a cross-sectional view of the pet feeding apparatus of the first embodiment.

FIG. 1 illustrates a perspective view of a pet feeding apparatus 1 according to a first embodiment of the instant disclosure. FIG. 2 illustrates a partial perspective view of the pet feeding apparatus 1 of the first embodiment. FIG. 3 illustrates a partial exploded view of the pet feeding apparatus 1 of the first embodiment. FIG. 4 illustrates a cross-sectional view of the pet feeding apparatus 1 of the first embodiment. As shown in FIG. 1, the pet feeding apparatus 1 comprises a feed tank 10, a discharge tank 20, and an ejection assembly 30. The feed tank 10, the discharge tank 20, and the ejection assembly 30 may be received in a housing 80 for protection, but embodiments are not limited thereto. Furthermore, in FIG. 1, the housing 80 is presented by a perspective manner (namely, the housing is illustrated by dashed lines), so that positions and relative relationships among the feed tank 10, the discharge tank 20, and the ejection assembly 30 can be clearly presented.

As shown in FIGS. 1 to 4, the feed tank 10 is a bucket for receiving different pet foods (e.g., pet dry foods or medicines). The feed tank 10 comprises an accommodation chamber 11, a discharge outlet 12, and a feed inlet 13. The discharge outlet 12 and the feed inlet 13 are in communication with each other through the accommodation chamber 11. The pet food can be placed into the accommodation chamber 11 from the feed inlet 13 and can be guided out from discharge outlet 12.

As shown in FIGS. 1 to 4, in this embodiment, the feed tank 10 is in a standing configuration. The feed inlet 13 is located at a top portion of the feed tank 10, and the discharge outlet 12 is at a bottom portion of the feed tank 10. In this embodiment, the bottom portion of the feed tank 10 has a bottom wall 14. The discharge outlet 12 is defined through a portion of the bottom wall 14, such that the discharge outlet 12 is in communication with outside of the feed tank 10. In other words, in this embodiment, the discharge outlet 12 is a through hole on the bottom wall 14, and the accommodation chamber 11 and the discharge tank 20 are in communication with each other through the discharge outlet 12. In some embodiments, the feed tank 10 may be in a slanting configuration, and the discharge outlet 12 may be of a fan shape, a square shape, a round shape, an elliptical shape, or other irregular shapes.

As shown in FIGS. 1 to 4, in this embodiment, a size (the bore diameter or the width) of the feed inlet 13 of the feed tank 10 is greater than a size (the bore diameter or the width) of the discharge outlet 12, so that the pet food can be placed into the accommodation chamber 11 from the feed inlet 13 easily. Further, the small-sized discharge outlet 12 allows that the amounts of the pet food guiding out of the feed tank 10 can be controlled easily. Moreover, as shown in FIG. 2, in this embodiment, an upper portion of the accommodation chamber 11 is wider and a lower portion of the accommodation chamber 11 is narrower, the accommodation chamber 11 comprises an upper accommodation space 111 and a lower accommodation space 112 in communication with each other, and a volume of the upper accommodation space 111 is greater than a volume of the lower accommodation space 112. Accordingly, the pet food can be placed into the accommodation chamber 11 from the feed inlet 13 easily and the amounts of the pet food guided out of the feed tank 10 can be controlled easily. However, it is understood that, the size relationship between the feed inlet 13 and the discharge outlet 12 and the volume relationship between the upper accommodation space 111 and the lower accommodation space 112 are provided as illustrative examples, but not limitations to the instant disclosure.

As shown in FIGS. 1 to 4, the discharge tank 20 is a bucket for receiving the pet food guiding out of the discharge outlet 12 of the feed tank 10. The discharge tank 20 comprises an ejection outlet 21, an inlet 22, and an ejection chamber 23 located between the ejection outlet 21 and the inlet 22. The feed tank 10 and the discharge tank 20 may be assembled with each other, so that the inlet 22 of the discharge tank 20 communicates with the discharge outlet 12 of the feed tank 10. Therefore, the pet food guided out of the discharge outlet 12 can enter into the ejection chamber 23 of the discharge tank 20 from the inlet 22.

As shown in FIGS. 1 to 4, in this embodiment, the inlet 22 and the ejection outlet 21 are at two opposite sides of the ejection chamber 23. The discharge tank 20 is located under the feed tank 10. A height position of the inlet 22 is greater than a height position of the ejection outlet 21, and the inlet 22 faces the feed tank 10 and corresponds to the discharge outlet 12 at the bottom portion of the feed tank 10. The ejection outlet 21 is slantingly configured. An angle is between an orientation of the ejection outlet 21 and an orientation of the inlet 22, and the angle may be 30 degrees, 45 degrees, 90 degrees, 120 degrees, or the like.

As shown in FIGS. 1 to 4, the ejection assembly 30 is provided for ejecting out the pet food entering into the ejection chamber 23 of the discharge tank 20 from the ejection outlet 21. The ejection assembly 30 comprises a rotation blade 31 and a driving member 35. The rotation blade 31 is received in the ejection chamber 23, and the rotation blade 31 comprises a rotation shaft 32 and at least one blade 33 extending from the rotation shaft 32. In this embodiment, the number of the blades 33 is two, and the two blades 33 respectively extend from two opposite sides of the rotation shaft 32. A cross section of the ejection chamber 23 is approximately of a round shape, and the rotation blade 31 and the ejection chamber 23 are of a coaxial configuration. The driving member 35 is connected to the rotation shaft 32 of the rotation blade 31 and is capable of driving the rotation shaft 32 to rotate with respect to the ejection chamber 23. During the rotation of the rotation shaft 32, the rotation shaft 32 is capable of driving the blades 33 to swing from the inlet 22 toward the ejection outlet 21, so that the pet food entering into the ejection chamber 23 can be ejected out from the ejection outlet 21.

Furthermore, as shown in FIGS. 1 to 4, in this embodiment, the driving member 35 comprises a motor 36 and a gear assembly 37. The gear assembly 37 may comprise several gears connected between the motor 36 and the rotation blade 31. The motor 36 drives the rotation shaft 32 to rotate with the gear assembly 37. As shown in FIG. 3, in this embodiment, the motor 36 and the gear assembly 37 are disposed outside of the discharge tank 20, and the gear assembly 37 comprises a first gear 38 and a second gear 39 engaged with each other. A shaft of the first gear 38 is connected to the motor 36, and a shaft of the second gear 39 is connected to the rotation shaft 32 of the rotation blade 31. Accordingly, when the motor 36 operates, the first gear 38 rotates along with the operation of the motor 36, so that the second gear 39 and the rotation shaft 32 are driven to rotate.

However, it is understood that the driving member 35 shown in the first embodiment is provided as an illustrative example, but not limitations of the instant disclosure. In some embodiments, the driving member 35 may drive the rotation shaft 32 to rotate with other transmission mechanisms, such as a worm gear/worm transmission mechanism or a chain/belt transmission mechanism. Alternatively, in some embodiments, the driving member 35 may only include the motor 36, so that the motor 36 directly drives the rotation shaft 32 to rotate.

Further, as shown in FIG. 3, in the gear assembly 37, a size of the first gear 38 is the same as a size of the second gear 39. Hence, when the first gear 38 rotates, the second gear 39 and the rotation blade 31 can have the same and sufficient rotation speeds, so that the pet food entering into the ejection chamber 23 can be thrown out rapidly from the ejection outlet 21. In some embodiments, the first gear 38 and the second gear 39 may have different sizes according to actual requirements, so that the rotation speed and the torque of the rotation blade 31 can be adjusted.

Figure 5:
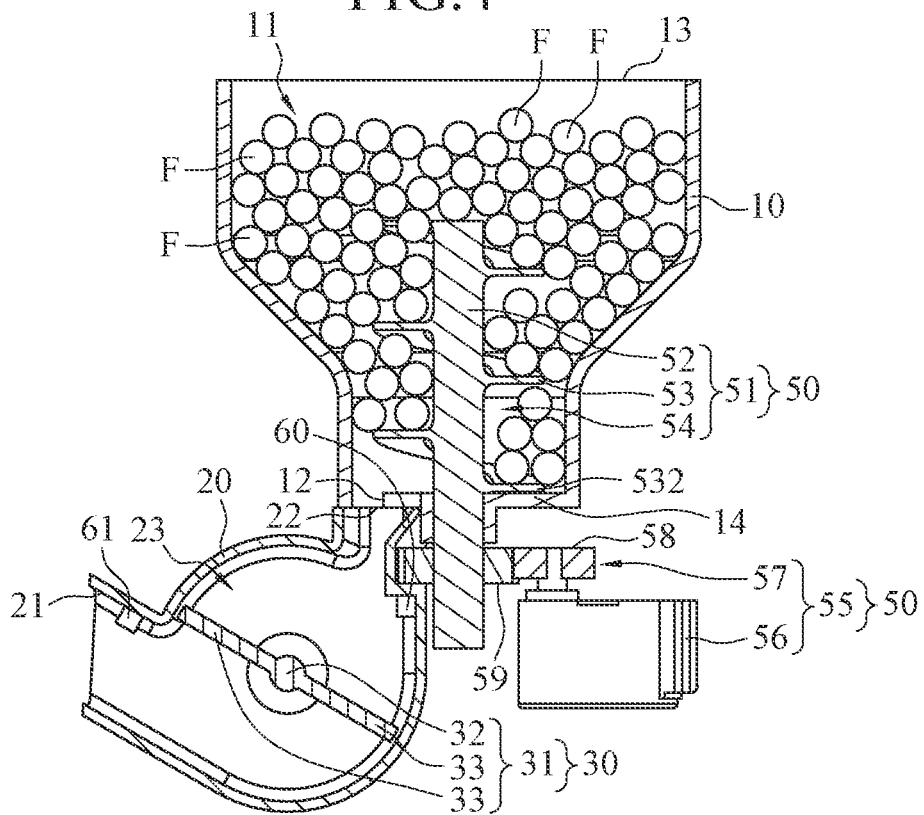
FIG. 5 illustrates a schematic view showing that the pet feeding apparatus of the first embodiment performs a feed feeding operation.
Figure 6:
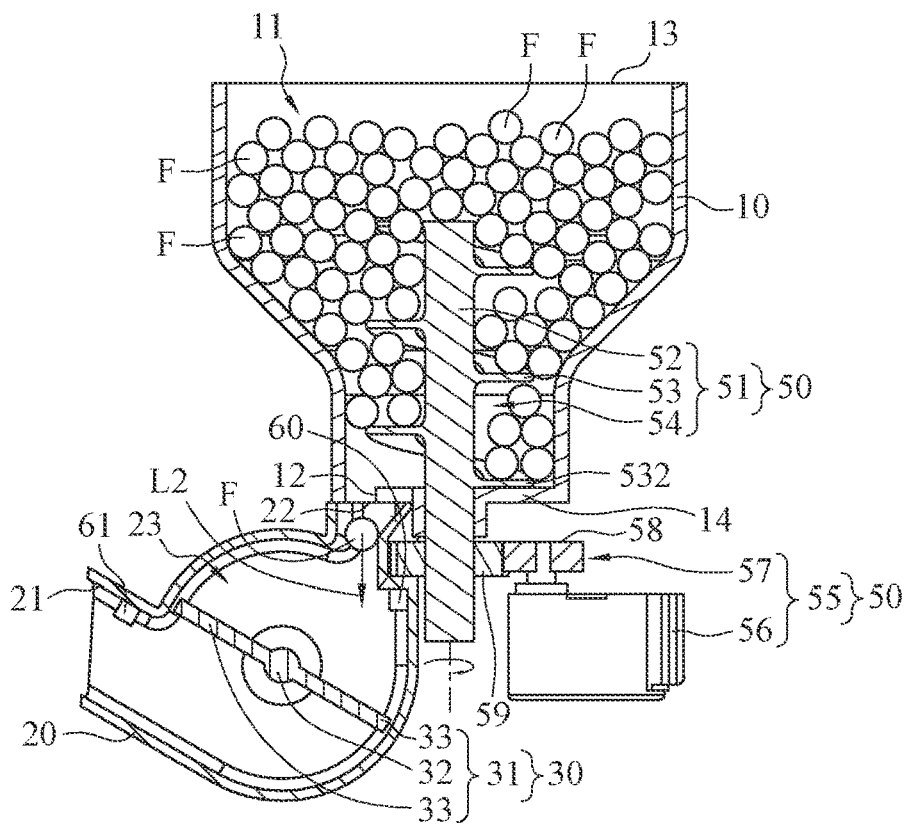
FIG. 6 illustrates a schematic view showing that the pet feeding apparatus of the first embodiment performs a feed guiding operation.
Figure 7:
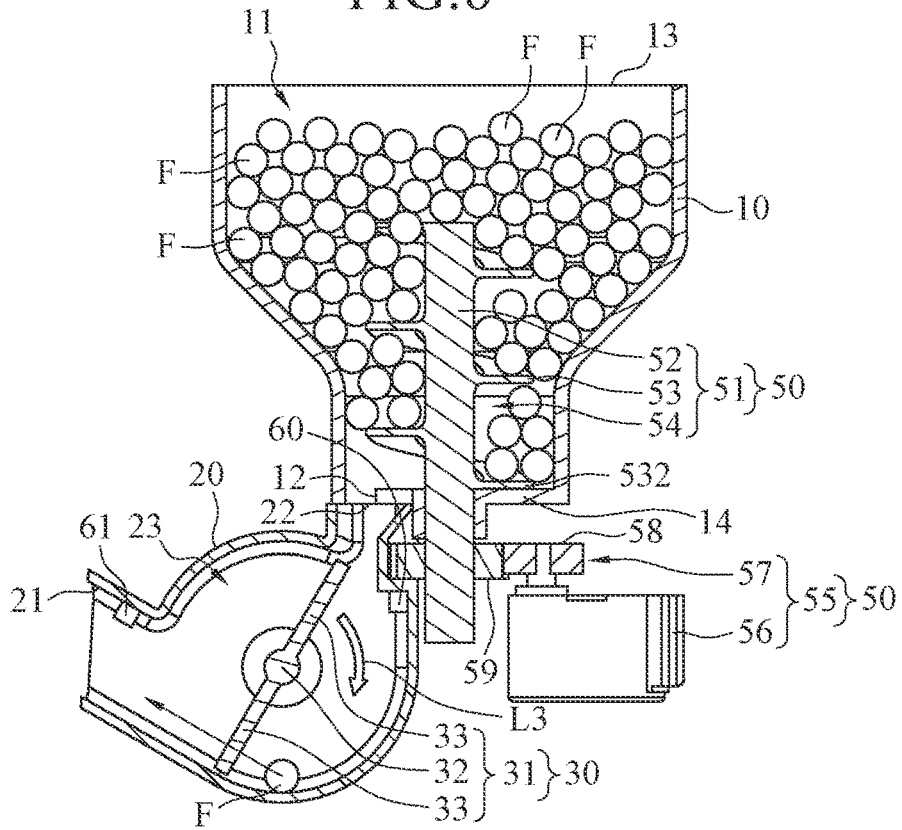
FIG. 7 illustrates a schematic view showing that the pet feeding apparatus of the first embodiment performs a feed ejection operation.

Accordingly, when the pet food F (as indicated in FIGS. 5 to 7) enter into the ejection chamber 23 of the discharge tank 20, the pet food F can be ejected out from the ejection outlet 21 by controlling the driving member 35 to drive the rotation blade 31 to rotate. Accordingly, the feeding object can be achieved, and the pet owners can have interaction with their pets and can control the feeding amounts of the pet food. Moreover, during the operation, the rotation blade 31 does not hit other components, thus reducing the noise during the operation of the apparatus. Detail operations of the apparatus are further described with figures.

FIG. 5 illustrates a schematic view showing that the pet feeding apparatus 1 of the first embodiment performs a feed feeding operation. FIG. 6 illustrates a schematic view showing that the pet feeding apparatus 1 of the first embodiment performs a feed guiding operation. FIG. 7 illustrates a schematic view showing that the pet feeding apparatus 1 of the first embodiment performs a feed ejection operation. First, as shown in FIG. 5, during feeding the pets, the user may fill a certain amount of pet food F (in this embodiment, the pet food F is pet dry foods for example) into the accommodation chamber 11 from the feed inlet 13 of the feed tank 10. In this embodiment, a feed guiding assembly 50 is further disposed in the feed tank 10 for guiding the pet food F out from the discharge outlet 12, but embodiments are not limited thereto.

As shown in FIGS. 2 and 5, in this embodiment, the feed guiding assembly 50 comprises a guiding member 51 and an actuation member 55. The guiding member 51 is disposed in the accommodation chamber 11 of the feed tank 10, the guiding member 51 comprises a shaft member 52 and a spiral blade 53 extending from the shaft member 52, and a spiral guiding channel 54 is formed between the spiral blade 53 and the shaft member 52. In this embodiment, the shaft member 52 is of a standing configuration, a top end of the shaft member 52 is located in the upper accommodation space 111 of the accommodation chamber 11, and a bottom end of the shaft member 52 protrudes out of the bottom wall 14 of the feed tank 10 and is connected to the actuation member 55. The spiral blade 53 comprises a first end 531 and a second end 532. The first end 531 is adjacent to the top end of the shaft member 52, the second end 532 is adjacent to the bottom end of the shaft member 52, and the second end 532 is adjacent to the discharge outlet 12 and the bottom wall 14 with respect to the first end 531. In other words, a distance between the first end 531 and the discharge outlet 12 (or the bottom wall 14) is greater than a distance between the second end 532 and the discharge outlet 12 (or the bottom wall 14). The actuation member 55 is capable of driving the shaft member 52 to rotate with respect to the accommodation chamber 11, so that the pet food F in the upper accommodation space 111 can be guided into the spiral guiding channel 54 in order, and the pet food F can be guided to the discharge outlet 12 in order; thereby, the amount of the pet food F falling into the discharge tank 20 can be controlled. Moreover, in this embodiment, a diameter of the guiding member 51 is slightly less than a diameter of the lower accommodation space 112. Specifically, in this embodiment, a distance between the spiral blade 53 of the guiding member 51 and an inner wall of the lower accommodation space 112 may be less than the size of the pet food F. For example, it is supposed that the minimum width of the pet food F is 2 centimeter (cm), the distance between the outer periphery of the spiral blade 53 of the guiding member 51 and the inner wall of the lower accommodation space 112 is less than 2 cm (for example, the distance may be 1.5 cm, 1 cm, 0.5 cm, or the like). Hence, the pet food F in the upper accommodation space 111 can be prevented from entering into the lower accommodation space 112 from outside of the guiding member 51 so as to influence the amount control of the pet food F.

As shown in FIGS. 2 and 5, in this embodiment, the actuation member 55 comprises a driving motor 56 and a transmission gear assembly 57. The transmission gear assembly 57 may comprise several gears connected between the driving motor 56 and the guiding member 51. The driving motor 56 drives the shaft member 52 to rotate with the transmission gear assembly 57. As shown in FIG. 2, in this embodiment, the driving motor 56 and the transmission gear assembly 57 are disposed outside of the feed tank 10, and the transmission gear assembly 57 comprises a driving gear 58 and a driven gear 59 engaged with each other. A shaft of the driving gear 58 is connected to the driving motor 56, and a shaft of the driven gear 59 is connected to the shaft member 52 of the guiding member 51. Accordingly, when the driving motor 56 operates, the driving gear 58 rotates along with the operation of the driving motor 56, so that the driven gear 59 and the shaft member 52 are driven to rotate.

However, it is understood that the actuation member 55 shown in the first embodiment is provided as an illustrative example, but not limitations of the instant disclosure. In some embodiments, the actuation member 55 may drive the shaft member 52 to rotate with other transmission mechanisms, such as a worm gear/worm transmission mechanism or a chain/belt transmission mechanism. Alternatively, in some embodiments, the actuation member 55 may only include the driving motor 56, so that the driving motor 56 directly drives the shaft member 52 to rotate.

Furthermore, as shown in FIGS. 2 and 5, in the transmission gear assembly 57, a size of the driving gear 58 is different from a size of the driven gear 59. For example, in this embodiment, the size of the driving gear 58 is less than the size of the driven gear 59. Therefore, when the driving motor 56 operates and drives the transmission gear assembly 57, the torque of the rotation of the guiding member 51 can be increased, thus preventing the rotation of the guiding member 51 from being retarded. Hence, the pet food F can be ensured to enter into the spiral guiding channel 54 in order, but embodiments are not limited thereto. The driving gear 58 and the driven gear 59 may have the same size according to actual requirements, so that the rotation speed and the torque of the guiding member 51 can be adjusted.

As shown in FIGS. 2 and 6, during the actuation member 55 drives the guiding member 51 to rotate, the second end 532 of the spiral blade 53 is driven to move toward the discharge outlet 12 (as indicated by the arrow L1 shown in FIG. 2), so that the pet food F closest to the discharge outlet 12 is pushed into the discharge outlet 12 and enters into the ejection chamber 23 from the inlet 22 of the discharge tank 20 (as indicated by the arrow L2 shown in FIG. 6). Accordingly, every turn of the guiding member 51, a predetermined amount (e.g., one or two) of the pet food F is pushed to enter into the discharge outlet 12. Hence, the user can control the feeding amount of the pet food F by controlling the number of turns of the guiding member 51 or the rotation ranges of the guiding member 51.

Further, as shown in FIG. 2, in one embodiment, the bottom wall 14 of the feed tank 10 may further comprise a blocking portion 141. The blocking portion 141 may be a protruding structure (e.g., a protruding rib, a protruding spot, or a protruding pattern) or a recessed structure (e.g., a recessed groove or a recessed pattern), but embodiments are not limited thereto. Moreover, the blocking portion 141 is adjacent to the discharge outlet 12. When the guiding member 51 does not operate, the blocking portion 141 blocks the pet food F from entering into the discharge outlet 12. When the guiding member 51 operates, the second end 532 of the spiral blade 53 pushes the pet food F, so that the pet food F gets across the blocking portion 141 and enters into the discharge outlet 12, thus being helpful in controlling the amount of the pet foods F entering into the ejection chamber 23. In some embodiments, the blocking portion 141 may be disposed on the spiral blade 53 and adjacent to the second end 532. Therefore, when the guiding member 51 does not operate, the blocking portion 141 can also block the pet food F from entering into the discharge outlet 12.

As shown in FIGS. 3 and 7, when the pet food F enters into the ejection chamber 23, by controlling the driving member 35 to drive the rotation blade 31 to rotate, the blades 33 swing from the inlet 22 toward the ejection outlet 21 (as indicated by the arrow L3 shown in FIG. 7, the blades 33 swing in a clockwise direction), thus ejecting the pet food F out from the ejection outlet 21. Accordingly, every turn of the rotation blade 31, a predetermined amount of the pet food F is driven to be ejected out of the ejection outlet 21, thereby controlling the feeding amount of the pet food F. Moreover, during the operation, the rotation blade 31 does not hit other components, thus reducing the noise during the operation of the apparatus. Moreover, the pets would possibly be curious about the way the pet food ejecting out of the apparatus, and the pets would possibly have some corresponding actions based on the food-ejection operation of the apparatus. Hence, during feeding the pets, the apparatus may allow the users to have interactions with their pets or may allow the pets to have appetites, thereby effectively improving the physiological health and mental health of the pets.

As shown in FIGS. 1 and 3, in this embodiment, the pet feeding apparatus 1 further comprises a rotatable base 70, and the feed tank 10 and the discharge tank 20 are disposed on the rotatable base 70. The rotatable base 70 may be driven to rotate, so that the orientation of the ejection outlet 21 of the discharge tank 20 can be changed. Accordingly, the position to which the pet food F is ejected can be properly controlled, thereby further improving the interaction between the pets and the pet owners.

Further, as shown in FIG. 3, the rotatable base 70 may be driven to rotate with a driving device 71. In this embodiment, the driving device 71 comprises a control motor 72 and a transmission mechanism 73. The transmission mechanism 73 may be a gear transmission mechanism (as shown in FIG. 3), a worm gear/worm transmission mechanism or a chain/belt transmission mechanism, and the transmission mechanism 73 is connected between the rotatable base 70 and the control motor 72, so that the control motor 72 can drive the rotatable base 70 to rotate with the transmission mechanism 73. In some embodiments, the driving device 71 may only include the control motor 72, so that the control motor 72 directly drives the rotatable base 70 to rotate.

In some embodiments, the driving member 35, the actuation member 55, and the driving device 71 may be manually controlled by users, operated automatically according to predetermined time setting, or operated automatically according to signal(s) generated by sensor(s). Detailed descriptions are provided as below.

As shown in FIG. 1, in this embodiment, the motor 36 of the driving member 35 is connected to a control unit 34. The control unit 34 is capable of controlling the motor 36 to drive the rotation shaft 32 of the rotation blade 31 to rotate according to an input signal, thereby driving the blades 33 to eject the pet food F out from the ejection outlet 21. For example, the control unit 34 may have a connection with a user's control device (e.g., a smart phone, a tablet computer, a notebook computer, a remote control, or other devices with control interfaces) through a communication unit, so that the control unit 34 and the control device can transmit signals to each other. The communication unit may be a wired communication unit or a wireless communication unit. The wired communication unit may have, for example, an Ethernet network interface, a USB interface, an HDMI interface (high definition multimedia interface), an MHL (mobile high-definition link), or the like. The wireless communication unit may be, for example, a Bluetooth unit, a Wi-Fi unit, or the like. When the user tends to feed the pet, the user can operate the control device to send the input signal to the control unit 34 through the communication unit so as to control the driving member 35 to operate. The control unit 34 may be accomplished, for example, by a chip, a circuit region of a chip, a firmware circuit, a circuit board having several electronic components and wires, or a storage medium storing a plurality of sets of codes.

In some embodiments, similarly, the actuation member 55 and the driving device 71 may be connected to different control units. Accordingly, the signal inputted by the user can control the operation of the actuation member 55, so that the pet food F can be guided into the ejection chamber 23 of the discharge tank 20. Alternatively, the signal inputted by the user can control the operation of the driving device 71, so that the rotatable base 70 can be driven by the driving device 71 to rotate.

In some embodiments, the driving member 35, the actuation member 55, and the driving device 71 may be operated automatically according to predetermined timings, respectively. Taking the driving member 35 as an example, the user is allowed to have a connection with the control unit 34 to which the driving member 35 is connected, so that the user can set at least one timing (e.g., 8:00 AM, 12:00 PM, and/or 6:00 PM). According to the set timing(s), the control unit 34 can control the driving member 35 to drive the rotation shaft 32 of the rotation blade 31 to rotate, thus ejecting the pet food F out from the ejection outlet 21 automatically, thereby achieving the automatic feeding function. In other embodiments, the set timings may be an operation interval time (e.g., 5 minutes, 10 minutes, or 20 minutes), and the control unit 34 controls the driving member 35 according to the operation interval time. That is, in this embodiment, the control unit 34 controls the driving member 35 per, for example, 5 minutes, 10 minutes, or 20 minutes. Furthermore, the actuation member 55 and the driving device 71 may be operated in the same manner or in similar manners, repeated descriptions are omitted.

As shown in FIGS. 3 and 6, in this embodiment, a feed sensor 60 and a discharge sensor 61 are further disposed in the ejection chamber 23 of the discharge tank 20. The feed sensor 60 is adjacent to the inlet 22 and connected to the driving member 35. The discharge sensor 61 is adjacent to the ejection outlet 21 and connected to the driving member 35. The feed sensor 60 is capable of detecting that the pet food F enters into the ejection chamber 23 of the discharge tank 20 from the feed tank 10 so as to generate a feeding signal. Hence, the driving member 35 can automatically drive the rotation shaft 32 of the rotation blade 31 to rotate according to the feeding signal generated by the detection of the feed sensor 60, thereby driving the blades 33 to eject the pet food F out from the ejection outlet 21.

Further, as shown in FIG. 6, the discharge sensor 61 is capable of detecting that the pet food F is ejected out from the ejection outlet 21 so as to generate a discharging signal. Hence, the driving member 35 can automatically stop the rotation of the rotation blade 32 according to the discharging signal generated by the detection of the discharge sensor 61. Accordingly, operations of the pet feeding apparatus 1 can be automatically started or stopped according to the signals generated by the detections of the sensors (e.g., the feed sensor 60 and the discharge sensor 61), thereby achieving automatic control effects for the pet feeding apparatus 1. In some embodiments, the driving device 71 may be automatically operated according to the feeding signal generated by the detection of the feed sensor 60 or may automatically stop operation according to the discharging signal generated by the detection of the discharge sensor 61. The feed sensor 60 and the discharge sensor 61 may be, but not limited to, infrared emitters and receivers, optical couplers, or the like.

Figure 8:
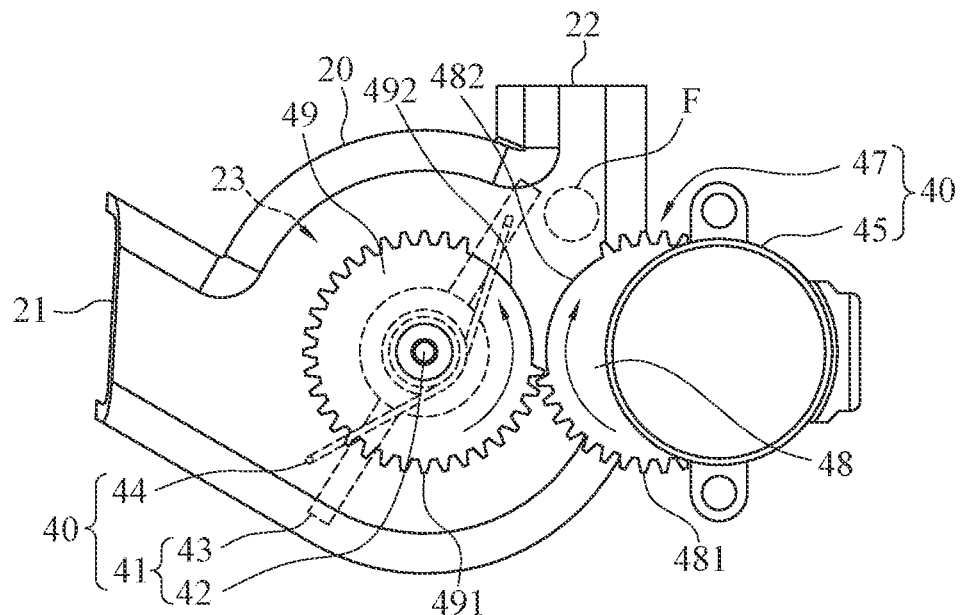
FIG. 8 illustrates a schematic view showing that a pet feeding apparatus according to a second embodiment of the instant disclosure is in a compressed condition.
Figure 9:
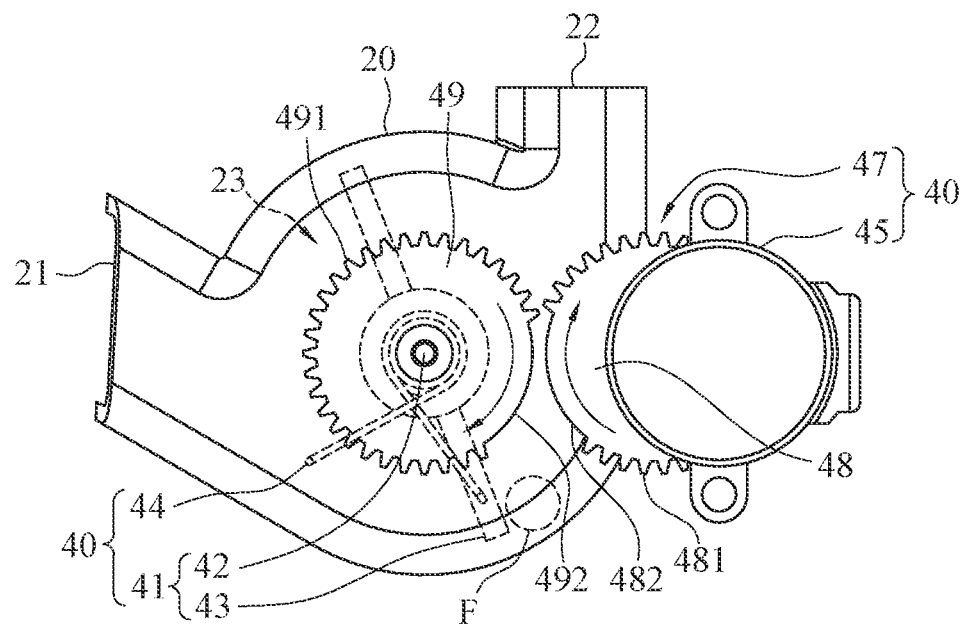
FIG. 9 illustrates a schematic view showing that the pet feeding apparatus of the second embodiment is in an ejected condition.

FIG. 8 illustrates a schematic view showing that a pet feeding apparatus according to a second embodiment of the instant disclosure is in a compressed condition. FIG. 9 illustrates a schematic view showing that the pet feeding apparatus of the second embodiment is in an ejected condition. As shown in FIGS. 8 and 9, one of the differences between the first embodiment and the second embodiment is the structure of the ejection assembly. In the second embodiment, the ejection assembly 40 comprises a rotation blade 41, a torsion spring 44, a driving member 45, and a transmission assembly 47. The torsion spring 44 is connected between the rotation blade 41 and the discharge tank 20. For example, one of two ends of the torsion spring 44 may be fixed to one of the blades 43 of the rotation blade 41, and the other end of the torsion spring 44 is fixed to an inner wall of the discharge tank 20. The transmission assembly 47 is connected between the driving member 45 and the rotation blade 41. The driving member 45 may be a driving motor, and with the transmission assembly 47, the driving member 45 selectively drives the rotation shaft 42 of the rotation blade 41 to rotate so as to twist the torsion spring 44 or releases the rotation shaft 42 so as to release the torsion spring 44, thereby achieving the effect of ejecting the pet food F out from the ejection outlet 21.

Specifically, in this embodiment, as shown in FIGS. 8 and 9, when the pet food F enters into the ejection chamber 23 of the discharge tank 20, the driving member 45 can drive the rotation shaft 42 of the rotation blade 41 to rotate in a direction (for example, in a counterclockwise direction) so as to twist the torsion spring 44, thus allowing the torsion spring 44 to be compressed to store a resilient elastic force. When the driving member 45 releases the rotation shaft 42, the driving member 45 also releases the torsion spring 44, so that the rotation shaft 42 of the rotation blade 41 can be rotated in a counter direction (for example, in a clockwise direction) by the resilient elastic force stored in the torsion spring 44. Accordingly, the blades 43 are be driven to swing from the inlet 22 toward the ejection outlet 21 rapidly, thus allowing the pet food F to be ejected out from the ejection outlet 21.

As shown in FIGS. 8 and 9, in this embodiment, the transmission assembly 47 comprises a first gear 48 and a second gear 49. The first gear 48 is connected to the driving member 45, and the second gear 49 is connected to the rotation shaft 42 of the rotation blade 41. The first gear 48 is an intermittent gear and has a first tooth portion 481 and a first non-tooth portion 482. In this embodiment, the first tooth portion 481 occupies about three fourth of an outer periphery of the first gear 48, while the first non-tooth portion 482 occupies one fourth of the outer periphery of the first gear 48, but embodiments are not limited thereto. The proportion between the first tooth portion 481 and the first non-tooth portion 482 of the first gear 48 may be adjusted according to actual requirements. For example, the first gear 48 may be a half-tooth gear, and the first tooth portion 481 and the first non-tooth portion 482 respectively occupy one second of the outer periphery of the first gear 48. The second gear 49 is also an intermittent gear and has a second tooth portion 491 and a second non-tooth portion 492, and the first tooth portion 481 of the first gear 48 is engaged with the second tooth portion 491 of the second gear 49. In this embodiment, the second tooth portion 491 occupies about three fourth of an outer periphery of the second gear 49, while the second non-tooth portion 492 occupies one fourth of the outer periphery of the second gear 49, but embodiments are not limited thereto. The proportion between the second tooth portion 491 and the second non-tooth portion 492 of the second gear 49 may be adjusted according to actual requirements. For example, the second gear 49 may be a half-tooth gear, and the second tooth portion 491 and the second non-tooth portion 492 respectively occupy one second of the outer periphery of the second gear 49.

Accordingly, the driving member 45 can drive and release the rotation shaft 42 of the rotation blade 41 by the transmission assembly 47. Specifically, in this embodiment, as shown in FIG. 8, in the transmission assembly 47, one of two ends of the first tooth portion 481 of the first gear 48 may be engaged with one of two ends of the second tooth portion 491 of the second gear 49. Therefore, when the pet food F enters into the ejection chamber 23 of the discharge tank 20, the driving member 45 can drive the first gear 48 to rotate (here, in the clockwise direction) so as to drive the second gear 49 and the rotation shaft 42 to rotate (here, in the counterclockwise direction), thus compressing the torsion spring 44 to store the resilient elastic force. As shown in FIG. 9, when the first gear 48 and the second gear 49 are rotated with respect to each other, such that the other end of the first tooth portion 481 is engaged with the other end of the second tooth portion 491, the driving member 45 is capable of keeping driving the first gear 48 to rotate in the clockwise direction. At this time, due to the configuration of the first non-tooth portion 482 and the second non-tooth portion 492, the first gear 48 and the second gear 49 are disengaged from each other, so that the second gear 49 and the rotation shaft 42 are released and the torsion spring 44 is released as well. Hence, the rotation shaft 42 of the rotation blade 41 rapidly rotates toward a direction opposite to the rotation direction of the second gear 49 (here, the rotation direction of the rotation shaft 42 of the rotation blade 41 is the clockwise direction) by the resilient elastic force stored in the torsion spring 44, thereby driving the blades 43 to swing from the inlet 22 toward the ejection outlet 21 rapidly. Accordingly, the pet food F can ejected out from the ejection outlet 21.

As above, according to the pet feeding apparatus of one or some embodiments of the instant disclosure, after the pet food enters into the ejection chamber of the discharge tank from the feed tank, the driving member drives the rotation blade to rotate so as to drive the blade to swing from the inlet toward the ejection outlet. Therefore, the pet food can be ejected out from the ejection outlet for feeding the pets. In addition, the guiding assembly of the feed tank can be utilized to control the feeding amount of the pet food. Moreover, the pets would possibly be curious about the way the pet food ejecting out of the apparatus. Hence, during feeding the pets, the apparatus may allow the users to have interactions with their pets. Furthermore, during the operation, the rotation blade does not hit other components, thus reducing the noise during the operation of the apparatus, preventing the pets from being scared by excessive sounds or noises.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A pet feeding apparatus comprising:
    a feed tank comprising an accommodating chamber and a discharge outlet communicating with the accommodating chamber;
    a discharge tank comprising an ejection outlet, an inlet, and an ejection chamber located between the ejection outlet and the inlet, wherein the inlet communicates with the discharge outlet of the feed tank; and an ejection assembly comprising a rotation blade and a driving member, wherein the rotation blade is received in the ejection chamber, the rotation blade comprises a rotation shaft and a blade extending from the rotation shaft, and the driving member is connected to the rotation shaft and is capable of driving the rotation shaft to rotate with respect to the ejection chamber, so that the driving member drives the blade to swing from the inlet toward the ejection outlet;

wherein the ejection assembly comprises a torsion spring and a transmission assembly, the torsion spring is connected between the rotation blade and the discharge tank, and the transmission assembly is connected between the driving member and the rotation blade, and wherein, with the transmission assembly, the driving member selectively drives the rotation shaft to rotate so as to twist the torsion spring or releases the rotation shaft so as to release the torsion spring.

2. The pet feeding apparatus according to claim 1, wherein the driving member comprises a motor and a gear assembly, the gear assembly is connected between the motor and the rotation blade, and the motor drives the rotation shaft to rotate with the gear assembly.

3. The pet feeding apparatus according to claim 2, wherein the gear assembly comprises a first gear and a second gear engaged with each other, and a size of the first gear is the same as a size of the second gear.

4. The pet feeding apparatus according to claim 1, wherein the transmission assembly comprises a first gear and a second gear, the first gear is an intermittent gear and has a first tooth portion and a first non-tooth portion, the second gear is an intermittent gear and has a second tooth portion and a second non-tooth portion, and the first tooth portion is engaged with the second tooth portion.

5. The pet feeding apparatus according to claim 1, further comprising a feed guiding assembly, wherein the feed guiding assembly comprises a guiding member and an actuation member, the guiding member is disposed in the accommodation chamber of the feed tank, and the guiding member comprises a shaft member and a spiral blade extending from the shaft member, and wherein a spiral guiding channel is formed between the spiral blade and the shaft member, and the actuation member is connected to the shaft member, so that the actuation member drives the shaft member to rotate with respect to the accommodation chamber.

6. The pet feeding apparatus according to claim 5, wherein the spiral blade comprises a first end and a second end, and the second end is adjacent to the discharge outlet with respect to the first end, and wherein when the actuation member drives the shaft member to rotate, the second end is driven to move toward the discharge outlet.

7. The pet feeding apparatus according to claim 5, wherein the actuation member comprises a driving motor and a transmission gear assembly, the transmission gear assembly is connected between the driving motor and the guiding member, and the driving motor drives the shaft member to rotate with the transmission gear assembly.

8. The pet feeding apparatus according to claim 7, wherein the transmission gear assembly comprises a driving gear and a driven gear, and a size of the driving gear is different from a size of the driven gear.

9. The pet feeding apparatus according to claim 1, wherein the feed tank has a bottom wall, and the discharge outlet is on the bottom wall, and wherein the bottom wall further comprises a blocking portion, and the blocking portion is adjacent to the discharge outlet.

10. The pet feeding apparatus according to claim 1, wherein the driving member is connected to a control unit, and the control unit controls the driving member to drive the rotation shaft to rotate according to an input signal.

11. The pet feeding apparatus according to claim 1, further comprising a feed sensor disposed in the ejection chamber and adjacent to the inlet, wherein the driving member drives the rotation shaft to rotate according to a feeding signal generated by the feed sensor.

12. The pet feeding apparatus according to claim 1, further comprising a discharge sensor disposed in the ejection chamber and adjacent to the ejection outlet, wherein the driving member stops a rotation of the rotation shaft according to a discharging signal generated by the discharge sensor.

13. The pet feeding apparatus according to claim 1, further comprising a rotatable base, wherein the feed tank and the discharge tank are disposed on the rotatable base.

* * * * *